UNITED STATES PATENT OFFICE.

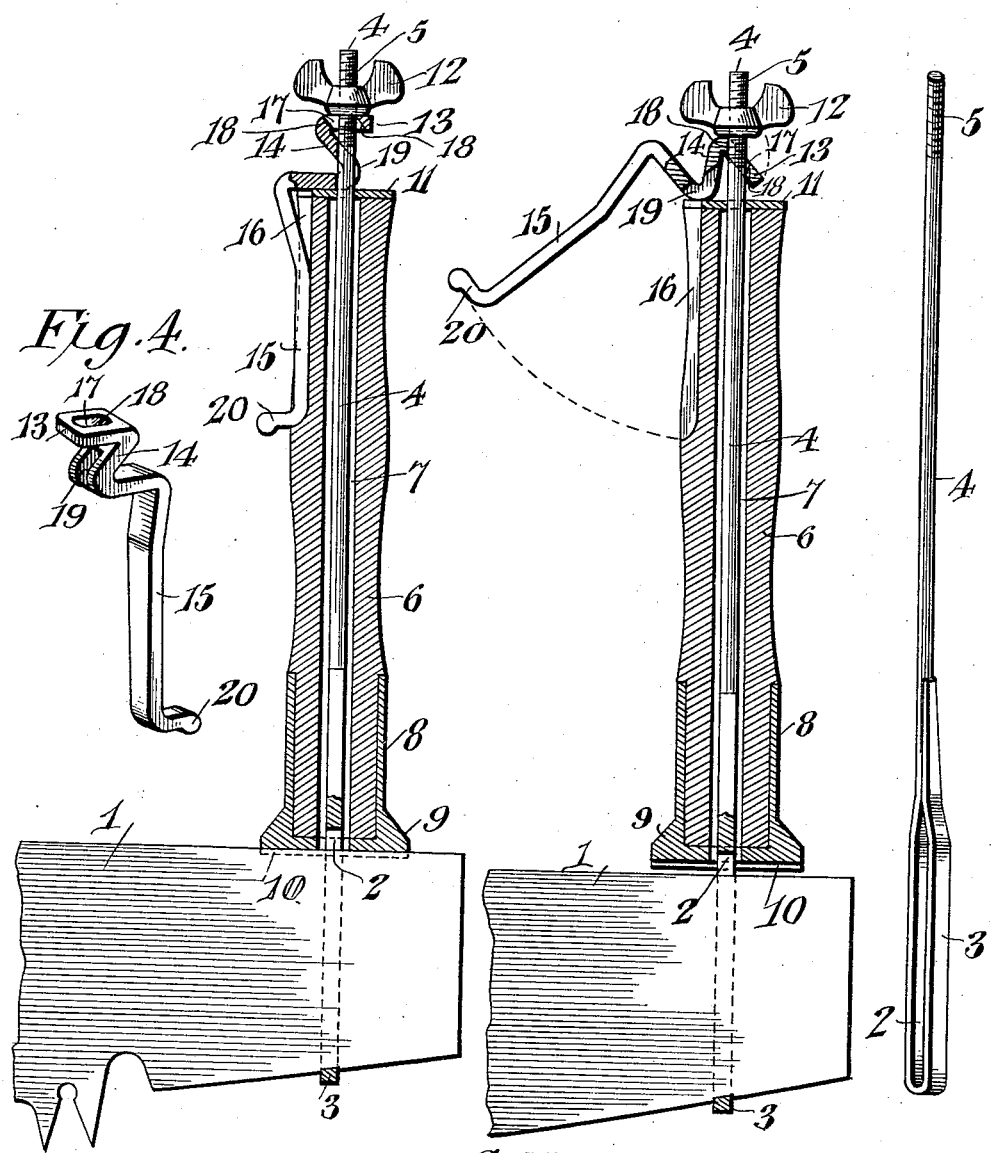

GEORGE HENDRICKSON KNUCKLES, OF SLUSHER, KENTUCKY.

DETACHABLE SAW-HANDLE.

1,060,909. Specification of Letters Patent. Patented May 6, 1913.

Application filed January 20, 1912. Serial No. 672,447.

*To all whom it may concern:*

Be it known that I, GEORGE H. KNUCKLES, a citizen of the United States, residing at Slusher, in the county of Bell and State of Kentucky, have invented a new and useful Detachable Saw-Handle, of which the following is a specification.

This invention relates to detachable handles for saws, and particularly that type of handle used for the manipulation of a crosscut saw in the sawing of logs into lengths.

It is frequently necessary in the logging industry that the saw be quickly removed from the log to prevent its being broken by a settling or rolling of the log upon which it is being used. It is also often advantageous to be able to withdraw the saw lengthwise from the kerf when it is impossible to remove it laterally by reason of the pinching action of the log.

Having these objects in view, my invention resides in the particular arrangement and construction of the parts whereby the handle may be quickly removed from the blade and as expeditiously replaced, the same being moreover securely held in position at other times. The constructional features of the invention whereby this object is attained are particularized in the appended claims, and will be readily understood from the following complete description when read in connection with the accompanying drawings, in which is illustrated the preferred embodiment.

In the drawings—Figure 1 is a vertical longitudinal section through the handle when clamped upon the saw; Fig. 2 is a similar view showing the raised position; Fig. 3 is a detailed perspective of the clamping rod; and Fig. 4 a similar view of the clamping lever.

In these drawings, 1 designates a saw blade which is embraced within the space 2, formed by the looped end 3 of the clamping rod 4 which rod is screw-threaded in its upper portion, as indicated at 5. The handle 6 has a longitudinal bore 7, adapted to receive the rod 4, and, at its lower end said handle is seated in a ferrule 8, extending at 9 longitudinally of the saw and provided on its end face with a slot 10 to receive the back edge of the blade. The handle is also advantageously provided at its upper end with a cap 11, the cap and ferrule both being provided with centrally-arranged openings for the passage of the rod 4. A wing nut 12 is threaded upon the upper end of the rod 4, with its lower face spaced from the cap 11 of the handle. Mounted upon the rod 4 is a cam lever 13, having a head 14 of substantially Z-shape, and a depending arm 15 arranged to enter and be housed within a slot 16 in the side face of the handle 6. The upper horizontal portion of the Z-shaped head is provided with an aperture 17 to receive the rod 4, said aperture having its walls advantageously arranged at an inclination as shown at 18 in order to facilitate the swinging of said head in a plane cutting the axis of the rod. The Z-shaped head of the lever is also provided at the meeting angle of the diagonal and lower horizontal portions with an open slot 19 arranged to receive the rod 4 when the lever is brought to the clamping position shown in Fig. 1. Those portions of the Z-shaped head where the diagonal meets the end portions are rounded. That end of the diagonal joining the portion of the head connected with the arm 15 is rounded in such a manner that when the lever is moved to the clamping position there is produced a progressive lengthening of the distance between the engaging points of the head with the cap 11 and nut 12, respectively. The movement of the end of the head connected to the arm 15 toward or from the rod 4, therefore, effects a longitudinal movement of the rod 4 with respect to the handle.

The depending arm 15 of the lever has a finger 20 extending at an angle thereto by which the lever is easily thrown from its clamping to its released position. It will be observed that the head of the lever acts as a cam which in the position shown in Fig. 2 permits the rod to drop and to release the end of the blade 1 from between the lower end of the loop 3 and the slot of the ferrule 9. While in the position shown in Fig. 1, the engagement of the lower horizontal portion of the head with the cap 11 forces the wing nut outwardly and clamps the blade between the saw loop and the slot 10 of the ferrule. The adjusting nut 12 serves the important function of regulating the clamping action to conform to blades of different widths.

When the saw is in use, the parts will occupy the position shown in Fig. 1, and the lever arm 15 being housed within the slot 16, is entirely out of the way and will be confined in its slot by the grasp of the operator upon said handle, the finger 20 projecting between the fingers of the operator. In case of a sudden emergency demanding the release of the blade from the handle, the lever is thrown to the position shown in Fig. 2 by the engagement of the operator's finger with the finger 20, whereupon the loop may be instantly slipped from the end of the blade.

In manufacturing an all-metal device, the handle 6, now made of wood, would be cast integral with the ferrule 8 and the cap 11.

What is claimed is—

1. A detachable handle for saw blades comprising a tubular member adapted to be grasped by the hand of an operator, a clamping rod extending through the tubular handle and having one end formed to coact with the corresponding end of the handle to clamp a saw blade, said rod being of a length to extend through the handle and beyond that end remote from the blade engaging end, and a cam lever carried by the rod at the end remote from the saw engaging end thereof, said handle having an exterior recess in that portion remote from the saw engaging end and the lever being provided with a manipulating arm movable into and out of the recess and when in the recess holding the cam in operative position and adapted to be retained in the recess by the hand of the operator when grasping the handle.

2. A handle for saw blades comprising a tubular member adapted to be grasped by the hand of an operator, a clamping rod extending through the tubular member and beyond both ends thereof, said rod being formed at one end to engage over the saw blade and at the other end provided with an adjusting nut, and a cam lever having a Z-shaped head traversed by the rod with one end of the Z portion adapted to bear against the nut and the other end of the Z portion adapted to engage the handle and the head being also provided with an open slot to embrace the rod when the lever is in clamping position.

In testimony, that I claim the foregoing as my own, I have hereto affixed my signature in the presence of two witnesses.

GEORGE HENDRICKSON KNUCKLES.

Witnesses:
 ROBT. VANLEVER,
 J. C. SLUSHER.

---

Copies of this patent may be obtained for five cents each, by addressing the "Commissioner of Patents, Washington, D. C."